United States Patent
Song

(10) Patent No.: US 6,549,492 B1
(45) Date of Patent: Apr. 15, 2003

(54) METHOD AND APPARATUS FOR RUN-OUT CORRECTION IN A DISK DRIVE

(75) Inventor: Hubert Song, Sunnyvale, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/344,263

(22) Filed: Jun. 30, 1999

(51) Int. Cl.$^7$ ............................................. G11B 7/095
(52) U.S. Cl. .............................. 369/44.29; 369/44.32; 369/44.34; 369/53.14
(58) Field of Search ........................ 369/44.32, 53.14, 369/44.34, 44.36, 44.29

(56) References Cited

U.S. PATENT DOCUMENTS

| | | | |
|---|---|---|---|
| 4,764,914 A | * | 8/1988 | Estes et al. |
| 5,128,917 A | * | 7/1992 | Kiyoshi ................... 369/44.32 |
| 5,220,546 A | | 6/1993 | Fennema |
| 5,260,923 A | * | 11/1993 | Baba .................... 369/44.32 X |
| 5,535,327 A | | 7/1996 | Verinsky et al. |
| 5,581,715 A | | 12/1996 | Verinsky et al. |
| 5,617,388 A | * | 4/1997 | Ishioka et al. ....... 369/44.32 X |
| 5,761,164 A | | 6/1998 | Abe et al. |
| 5,870,363 A | | 2/1999 | Sun et al. |
| 5,886,963 A | | 3/1999 | Abe et al. |
| 6,137,753 A | * | 10/2000 | Grimsley ................. 369/44.32 |
| 6,236,630 B1 | * | 5/2001 | Kubo et al. .......... 369/53.14 X |
| 6,266,304 B1 | * | 7/2001 | Nagano et al. ........... 369/44.32 |
| 6,370,094 B1 | * | 4/2002 | Kishinami et al. ....... 369/44.32 |

FOREIGN PATENT DOCUMENTS

| | | |
|---|---|---|
| EP | 0547630 | 6/1993 |
| EP | 0647938 | 4/1995 |
| EP | 0649132 | 4/1995 |
| EP | 0736862 | 10/1996 |

OTHER PUBLICATIONS

"The Compact Disk Handbook", 2$^{nd}$ edition, by Ken C. Pohlmann, pp. 86–89 (1992).
"Philips Consumer Electronics–Compact Disk: *Nothing is Impossible*", pp. 1–26.
"Compact Disk Pickup Designs", by Cho Leung Chan, pp. 1–6.
"OTI–9780: *Preliminary Product Brief*", pp. 1–2.
"OTI–9780 Product Brief: *Technical Specifications*", pp. 1–2.
"OTI–975: *IDE CD Recordable/ReWritable Controller*", pp. 1–2.
"OTI–912: *IDE CD–ROM Controller*", pp. 1–2.
"*CD–The Inside Story*", by Glen Baddleley.
"*CD–The Inside Story–Part 1– General Principles*", by Glenn Baddeley.
"*CD– The Inside Story–Part 2– The Disc*", by Glenn Baddeley.
"*CD–The Inside Story–Part 3– Data Format*", by Glenn Baddeley, pp. 1–2.
"*CD–The Inside Story–Part 4– Sub–code*", by Glenn Baddeley, pp. 1–2.
"*CD–The Inside Story–Part 5– Laser Tracking*", by Glenn Baddeley, pp. 1–4.
"*CD–The Inside Story–Part 7– Digital to Analog Conversion*", by Glenn Baddeley, pp. 1–4.
"*CD–The Inside Story–Part 8– Over–sampling and Filtering*", by Glenn Baddeley, pp. 1–4.
"*CD–The Inside Story–Part 9– Mythology*", by Glenn Baddeley, pp. 1–2.
"*CD–The Inside Story–Postscript & References*", by Glenn Baddeley, pp. 1–2.
"*Audio Compact Disk–An Introduction*", by Professor Kelin J. Kuhn, pp. 1–7.
"*Mitsubishi <Control/Driver IC> M56755FP Spindle Motor Driver*", pp. 1–9.
"*Mitsubishi <Control/Driver IC> M56754SP 4–Channel Actuator Motor Driver*", pp. 1–7.

* cited by examiner

Primary Examiner—W. R. Young
(74) Attorney, Agent, or Firm—Pennie & Edmonds LLP

(57) ABSTRACT

To correct for run-out in an optical disk drive, a run-out reducing gain factor is selected. A run-out correction signal is produced by applying the run-out reducing gain factor to a center error signal. A servo drive signal is refined with the run-out correction signal to produce an adjusted servo drive signal. A tracking actuator is driven with the adjusted servo drive signal.

8 Claims, 12 Drawing Sheets

Block Diagram of Disk Drive System

Sled Carriage

Block Diagram of a Disk Drive System

Initialization of gain factor and stored first filtered center error signal

Correction for Run-Out During Play Mode

Correction for Run-Out During Search Mode

Transfer Function of the Mechanical Plant

Control function block

METHOD AND APPARATUS FOR RUN-OUT CORRECTION IN A DISK DRIVE

BRIEF DESCRIPTION OF THE INVENTION

This invention relates generally to disk drive systems. More particularly, this invention relates to a method and apparatus for run-out correction in a disk drive.

BACKGROUND OF THE INVENTION

Personal computers typically connect to an optical disk drive such as a CD-ROM or DVD-ROM to read data from a compact disk. On the compact disk, data is stored in the form of pits and lands patterned in a radial track. The track is formed in one spiral line extending from the inner radius of the disk to the outer edge. A pit is a location on the disk where data has been recorded by creating a depression in the surface of the disk with respect to the lands. The lands are the areas between the pits in the tangential direction. The reflectivity of the pits is less than the reflectivity of the lands. To store audio or digital information, the length of the pits and lands are controlled according to a predefined encoding format.

When reading information from the disc, light from a laser beam is directed onto the track and the light beam is reflected back to a photo-sensor. Since the pits and lands have different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as a RF signal, that is proportional to the energy of the light in the reflected light beam.

In FIG. 1, the relationship of the RF signal to the pits and lands is shown. A smaller pit or land decreases both the period and the amplitude of the RF signal. The RF signal in the pits and lands has opposite polarity.

One encoding format used in optical disk systems is eight-to-fourteen modulation (EFM). EFM reduces errors by minimizing the number "zero-to-one one-to-zero transitions. In other words, small pits are avoided. In EFM, the data signal includes no less than two zeros and no more than ten zeros between logical transitions at the pit edges. A zero is indicated by no change in the energy of the reflected beam for at least two clock periods. A one is indicated by a change in the energy of the reflected light beam, that is, a pit edge. Applying the EFM encoding rules, a pit or land will have a length corresponding to the amount of time for at least three and up to thirteen clock periods and the electronics will output a corresponding voltage as shown in FIG. 1.

In an optical disk drive, an optical head assembly includes the photo-sensor, a tracking actuator and a lens. The optical head assembly is mounted on a sled. The tracking actuator is supported by the sled. The lens is not directly attached to the sled, but is coupled to the tracking actuator. The lens is positioned between the photo-sensor and the disk to transmit the light beam from the laser onto the disk surface and to transmit the reflected light beam to the photo-sensor. The sled and tracking actuator position the lens with respect to the spiral track. The sled is driven by a sled motor that positions the head assembly radially across the disk. The tracking actuator is a voice coil motor (VCM) that positions the lens within the limits of the sled. Because the geometry of the photo-sensor is large with respect to a single track, the lens can be positioned within a range of tracks and the photo-sensor can properly detect the RF signal.

A search is performed to position the head assembly and lens over a target region of the spiral track. During searching, track crossings will be detected as the lens is moved radially across the spiral track. The track crossings provide relative position information with respect to an initial position on the disk.

For rough searches, the sled and sled motor provide primary positioning of the head assembly and lens. For fine searches, the tracking actuator provides primary positioning of the lens. A tracking actuator drive signal is used to control the tracking actuator.

For rough searches, some disk drives derive a sled motor drive signal from the number of tracks over which the head assembly is to be moved. A play mode follows each search to read address information and to perform a fine search to position the lens at a desired spiral address. Typically, the play mode is extended to allow the lens position to be re-centered with respect to the sled, thus further increasing access time.

A problem called run-out occurs for several reasons. Run-out occurs when the tracks on the disk are not circular, but oval. Run-out also occurs when the spindle motor does not rotate the disk in a perfectly circular manner but wobbles. In addition, run-out occurs when the center of the disk is not concentrically aligned with the center of the axis of rotation of the spindle motor.

Run-out creates problems during both playing and searching. During play mode, the lens must be moved to follow the eccentricity of the track. In optical disk drives, such as DVD disk drives, the amount of run-out may be equal to 190 track pitches.

During search mode, particularly when the optical disk drive is rotating the disk at a high speed, such as 4,000 revolutions per minute (RPM) or more, the lens encounters a higher speed relative to the disk, creating higher relative motion between the lens and the disk. For instance, when the head assembly and lens are stationary in an absolute fixed radial position with respect to a disk that has a run-out of 190 tracks and the disk is rotating at 4,000 RPM, the head assembly will detect a relative velocity of at least 2,800 tracks per second, even though the lens and head assembly are not moving. Under these operating conditions, when the lens is being moved at an actual absolute velocity of 2,800 tracks per second, the detected relative velocity will range from zero tracks per second to as much as 5,600 tracks per second depending on the position of the lens with respect to the peak run-out. Therefore, without correcting for run-out, it is difficult to accurately search across the disk.

During play mode, the tracking servo is on and the lens follows the spiral track. If the run-out is high, then there will be a residual off track error which can degrade the read signal from the main beam. The magnitude of the off-track error depends on the tracking servo loop gain at the run-out frequency. Typically, the peak run-out and the tracking servo loop gain at the run-out frequency are specified for disks, and if a disk meets the specification, reading is not impaired. Often, the total run-out exceeds that of the specifications while the specifications limit the tracking servo loop gain, and such disks may induce read errors. Therefore, there is a need to improve the readability of disks when the run-out exceeds specifications while maintaining the amount of tracking servo loop gain to within specifications.

In one method of correcting for run-out during play mode, the tracking error signal is band-pass filtered and used as a feed-forward signal to drive the tracking actuator. This method works well in constant angular velocity (CAV) play mode, but is not suitable for those disk drives operating at a constant linear velocity (CLV) such as CD or DVD disks because the rotational frequency, and therefore the run-out frequency, constantly changes.

In view of the foregoing, it would be highly desirable to provide a method and apparatus to correct for run-out in disk drives operating in both a constant angular velocity and a constant linear velocity.

SUMMARY OF THE INVENTION

A center error signal is refined with a run-out reducing gain factor which is included in a servo drive signal that is supplied to a tracking actuator. The center error signal represents the relative lens to disk motion. When the track servo is on, as the disk rotates, the center error signal will change and include deviations caused by the tracking servo tracking the run-out. The deviations caused by run-out will be referred to as a run-out component. The invention uses the run-out component to control the tracking actuator.

A method selects a run-out reducing gain factor. A run-out correction signal is produced by applying the run-out reducing gain factor to a center error signal. A servo drive signal is refined with the run-out correction signal to produce an adjusted servo drive signal. A tracking actuator is driven with the adjusted servo drive signal.

In an alternate embodiment, the center error signal is associated with the rotational position of the spindle motor, sampled and stored in a memory synchronized to the rotational position of the spindle motor. The sampled center error signal is retrieved from the memory in synchronization with the rotational position of the spindle motor. A run-out correction signal is produced by applying a run-out reducing gain factor to the retrieved center error signal. A servo drive signal is refined with the run-out correction signal to produce an adjusted servo drive signal. A tracking actuator is driven with the adjusted servo drive signal.

In another aspect of the invention, the center error signal is modified to compensate for the mechanical dynamics of the disk drive.

Alternately, an apparatus corrects for run-out in an optical disk drive. A preamplifier generates a center error signal. A high pass filter generates a filtered center error signal by removing at least a DC component in the center error signal. Another filter produces a filtered servo drive signal by applying a transfer function that compensates for the dynamics of the tracking actuator. A multiplier multiplies the filtered center error signal by a run-out reducing gain factor to produce a run-out correction signal. A summer adds the run-out correction signal to the filtered servo drive signal to produce an adjusted servo drive signal that is supplied to a tracking actuator.

In yet another aspect of the invention, a disk drive uses the apparatus of the present invention.

In this way, using the center error signal, run-out is corrected at all speeds when a disk drive is operated at either a constant angular velocity or a constant linear velocity. In addition, the invention corrects for run-out in both play and search modes. Therefore, the run-out correction will more accurately position the head and reduce access time.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
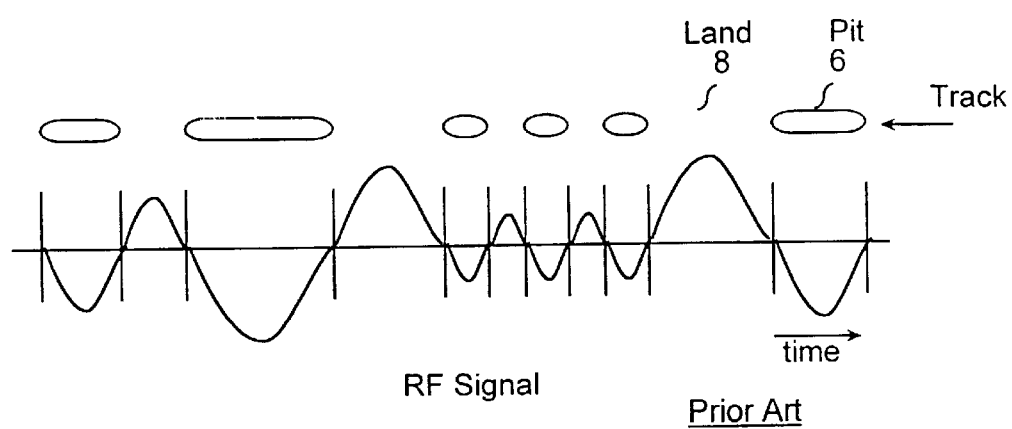
FIG. 1 illustrates the relationship between an analog RF signal and the pits and lands on a disk.
Figure 2:
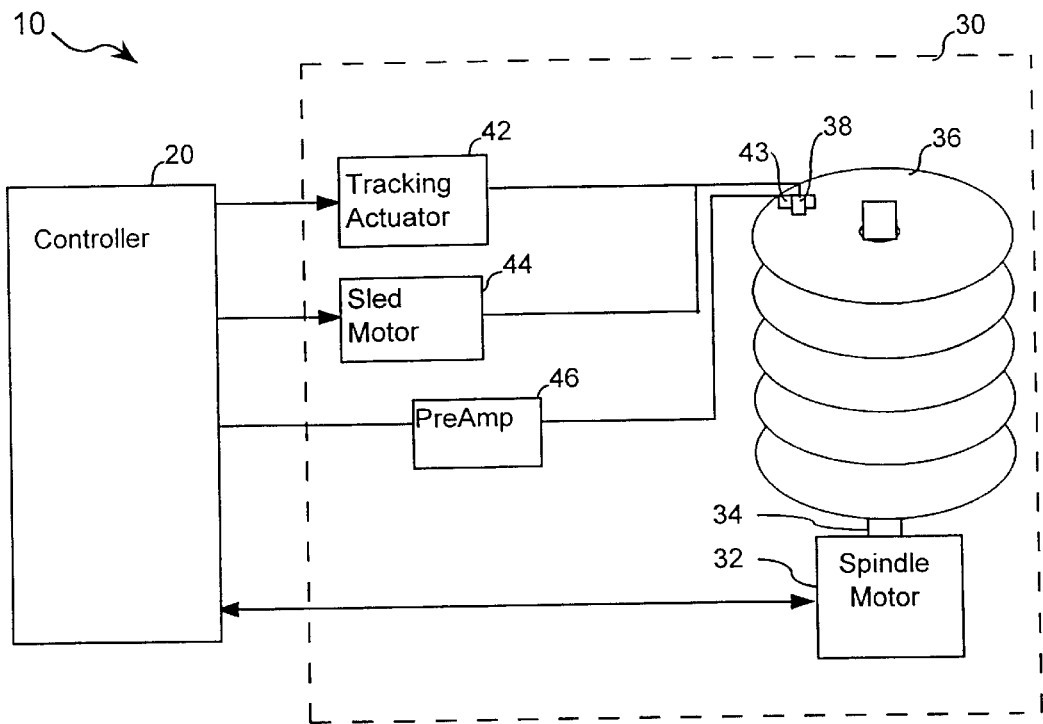
FIG. 2 illustrates a general architecture of a disk drive system in accordance with an embodiment of the present invention.

In FIG. 2, a disk drive system 10 has a controller unit 20 that connects to a disk drive 30 such as an optical disk drive. In the optical disk drive 30, a spindle motor 32 is attached to a spindle 34 which supports at least one disk 36. In response to commands from the controller unit 20, the spindle motor 32 rotates the spindle 34 and therefore the disk 36. While the disk 36 is rotating, an optical head assembly 38 transmits information from or writes information to the disk 36.

Figure 3:
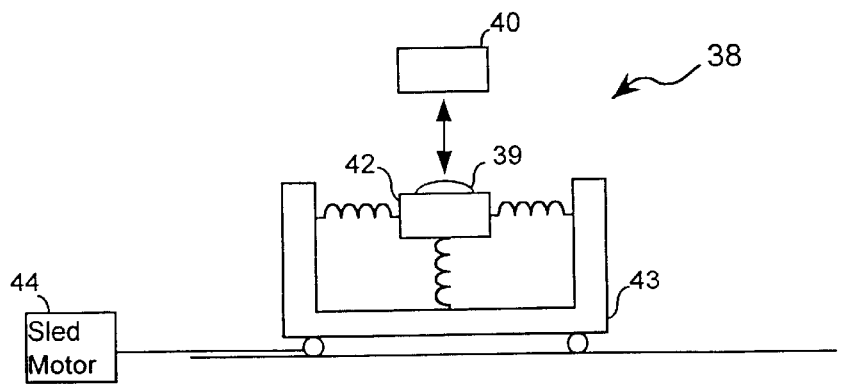
FIG. 3 illustrates a lens mounted in a sled of FIG. 2.

Referring also to FIG. 3, the optical head assembly 38 includes a lens 39, a photo-sensor 40 and a tracking actuator 42. In FIG. 2, the tracking actuator 42 is drawn separate from the head assembly 38 for simplicity. The lens 39 transmits light from the laser diode onto the disk surface and transmits the reflected light beam to the photo-sensor 40. The head assembly 38 is mounted on a sled 43. The tracking. actuator 42 is coupled to the lens 39 and moves the lens 39 within the confines of the sled 43. The tracking actuator 42 may be a voice coil motor. A sled motor 44 moves the sled 43.

Referring back to FIG. 2, the controller 20 controls the sled 43 and the tracking actuator 42 to position the head assembly 38 and lens 39, respectively, with respect to a target track on the disk 36. On rough searches, the sled motor 44 is the prime mover of the lens 39. On fine searches, the tracking actuator 42 is the prime mover of the lens 39. In one implementation, a rough search is a long search in which the lens 39 position is changed by 300 tracks or more by moving the sled, while a fine search is a short search in which the lens 39 position is changed by less than 300 tracks using the tracking actuator 42.

A preamplifier 46 receives an analog RF signal from the photo-sensor 40 and outputs an analog read channel signal.

Figure 4:
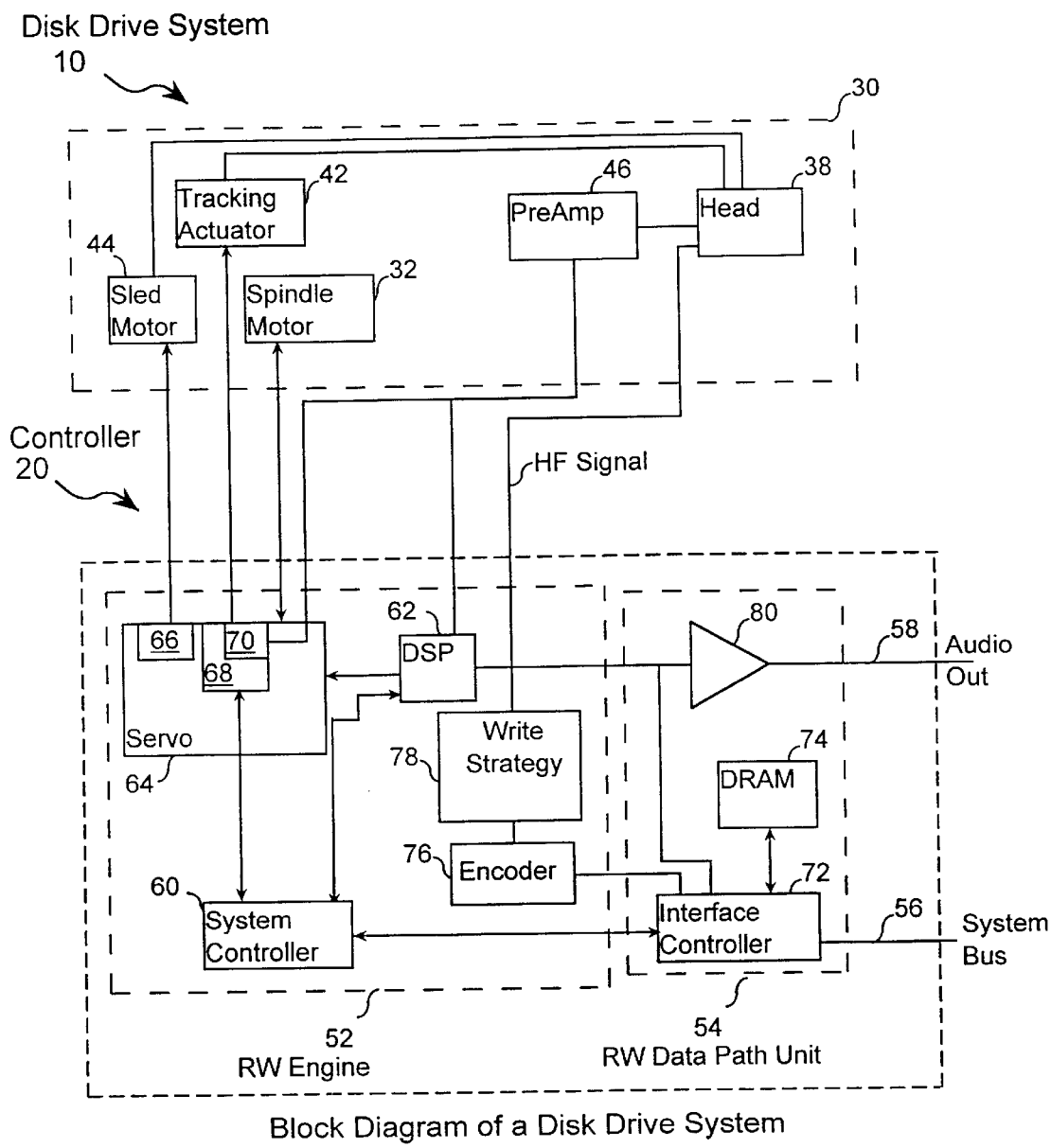
FIG. 4 illustrates a more detailed architecture of a disk controller in accordance with an embodiment of the present invention.

FIG. 4 is a more detailed block diagram of the disk drive system 10 including the disk controller 20 and its associated disk drive 30. In FIG. 4, the tracking actuator 42 is drawn separate from the head assembly 38 for simplicity. The disk controller 20 has a read/write (RW) engine 52 that connects to a read/write (RW) data path unit 54. The RW engine 52 communicates directly with the disk drive 30 while the RW datapath unit 54 communicates with a system bus 56 and supplies an audio signal to an audio output line 58.

The RW engine 52 has a system controller 60, a digital signal processor 62 and a servo control unit 64. The system controller 60 receives commands from and sends status to the system bus 56 via the RW datapath unit 54. In response to the commands from the system bus 56, the system controller 60 sends commands to and receives status information from the digital signal processor (DSP) 62 and the servo control unit 64 to read data from or write data to the disk.

The servo control unit 64 positions the head assembly with respect to a target track, and keeps the lens 39 centered and focused on the target track based on signals received via the lens 39 and the DSP 62. The servo control unit 64 sends signals to the tracking actuator 42, the sled motor 44 and spindle motor 32 to control tracking, disk rotation and focusing. The servo control unit 64 communicates with the sled motor 44 and the tracking actuator 42 to position the optical head assembly 38 and lens 39 precisely with respect to the spiral track to read the desired information from the disk 36. In particular, in the servo control unit 64, a sled motor driver 66 controls the sled motor 44 with a sled motor drive signal; and, an actuator driver 68 controls the tracking actuator 42 with a tracking actuator drive signal. In the actuator driver 68 of the servo control unit 64, the circuit 70 of the present invention adjusts the tracking actuator drive signal to correct for run-out.

The DSP 62 receives the analog read channel signal from the preamplifier 46. The analog read channel signal includes both digital data and control information. The DSP 62 processes the analog read channel signal and outputs control signals that are used by the servo control unit 64.

To write data to a disk, in the read/write data path unit 54, an interface controller 72 receives the data from the system bus 56, processes the data, and stores the data in the DRAM 74. The interface controller 72 sends the data bytes from the DRAM 74 to an encoder 76 in the RW engine 52. The encoder 76 encodes the data bytes and outputs an EFM signal.

When reading data from the disk, the DSP 62 receives the analog read channel signal and outputs a digital data signal. The interface controller 72 receives the digital data signal from the DSP 62 in a serial stream, descrambles the data, and assembles the data into eight-bit bytes. The interface controller 72 then stores the data in the DRAM 74. The DRAM 74 acts as a buffer for the digital data from the DSP 62. The interface controller 72 also performs error detection and correction operations on the buffered data and transfers the data to the system bus 56.

To provide an audio output, a digital-to-analog converter (DAC) 80 receives the digital data signal from the DSP 62 and outputs an audio signal on the audio output line 58.

Figure 5:
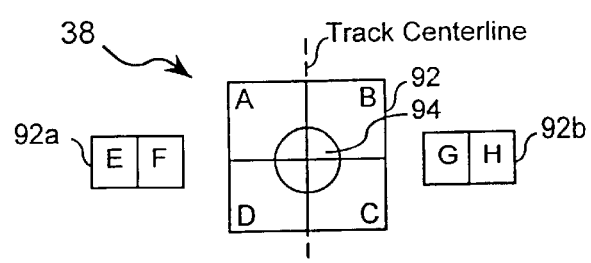
FIG. 5 illustrates a photo-diode that is mounted on the sled of FIGS. 2 and 4.

In FIG. 5, in the head assembly 38, a photo-diode 92 has four regions, A, B, C and D. The laser light is reflected from the disk surface onto the surface of the photo-diode 92 as a spot 94. When the head assembly 38 and therefore the photo-diode 92 are aligned along the centerline of a track, half of the spot 94 will project on regions A and D and half of the spot 94 will project on regions B and C. In other words, regions A and D correspond to one side of the track centerline, while regions B and C correspond to the other side of the track centerline.

Optical disk drives commonly use a servo technique referred to as three-beam pickup that generates a tracking error signal separate from the center error signal. In these disk drives, an additional pair of photo-diodes E-F and G-H, 92a and 92b, respectively, are placed on either side of photo-diode 92 on opposite sides of the track centerline. The additional pairs of photo-diodes 92a, 92b are placed such that they receive a portion of the laser beam reflected from adjacent tracks by appropriately spacing the photo-diodes 92a, 92b with respect to the adjacent tracks and splitting the laser beam with a diffraction grating. The additional photo-diodes 92a, 92b generate an EF signal and a GH signal, respectively. When the difference between the EF signal and the GH signal is equal to zero, the lens is properly positioned with respect to the center line of the desired track. When the difference between the EF and GH signal is not zero, the lens is offset from the track center line. Circuits and methods for generating the tracking error signal from the EF and GH signals are well-known.

Alternately, a single photo-diode is used instead of the pairs of photo-diodes such that one photo-diode is placed on either side of photo-diode 92.

Figure 6:
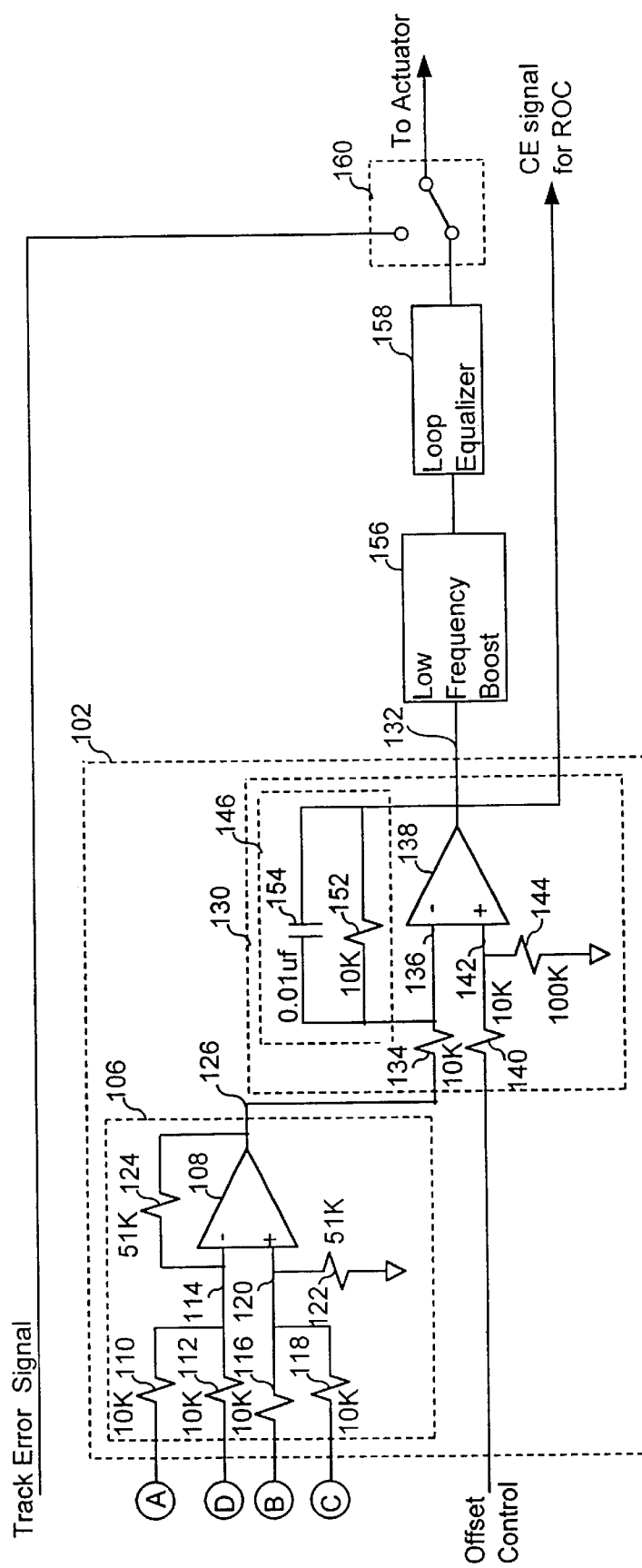
FIG. 6 illustrates a circuit for generating a center error signal in accordance with an embodiment of the present invention.

In FIG. 6 to generate the center error signal, in a preamplifier 102, in a push-pull block 106, a push-pull differential amplifier 108 generates a push-pull center error signal by combining the voltages from each region of the photo-diode in relationship (1) as follows:

$$(B+C)-(A+D) \qquad (1)$$

A gain factor associated with relation (1) has been omitted for simplicity. The push-pull differential amplifier 108 receives voltages corresponding to the portion of the spot projected on each region of the photo-diode, A, B, C and D. The signals from regions A and D are combined via input resistors 110 and 112, respectively, and supplied to a negative input line 114 of the push-pull differential amplifier 108. The signals from regions B and C are combined via input resistors 116 and 118, respectively, and supplied to a positive input line 120 of the push-pull differential amplifier 108. The positive input line 120 is also connected to a reference voltage, in this case ground, via resistor 122. A push-pull feedback resistor 124 provides feedback between the push-pull error signal on a push-pull differential amplifier output line 126 and the negative input line 114.

A center error adjustment block 130 applies an offset adjustment to the push-pull center error signal to produce an offset-adjusted center error signal on line 132. In a noteworthy aspect of the invention, which will be described below, the offset-adjusted center error signal is used to generate a run-out correction signal to adjust a servo signal to compensate for run-out.

In the center error adjustment block 130, the push-pull center error signal is received via an offset input resistor 134 and is supplied to a negative input line 136 of a center-offset differential amplifier 138. The system controller 60 supplies an offset control signal via an offset-control resistor 140 to the positive input line 142 of the center-offset differential amplifier 138. Resistor 144 is also connected to the positive input line 142 of the center-offset difference amplifier 138 and a reference voltage, in this case, ground.

A center-offset feedback filter 146 provides feedback between the output line 132 of the center-offset differential amplifier 138 and the negative input line 136 of the center-offset differential amplifier 138. In the center-offset feedback filter 146, resistor 152 is connected in parallel with capacitor 154.

The center error signal is further processed by a low frequency amplifier block 156 and a loop equalizer 158 before being supplied to the tracking actuator. The low frequency amplifier block 156 and the loop equalizer 158 are well-known.

The system controller controls switch 160 to supply either the center error signal or tracking error signal as the tracking actuator drive signal.

Figure 7:
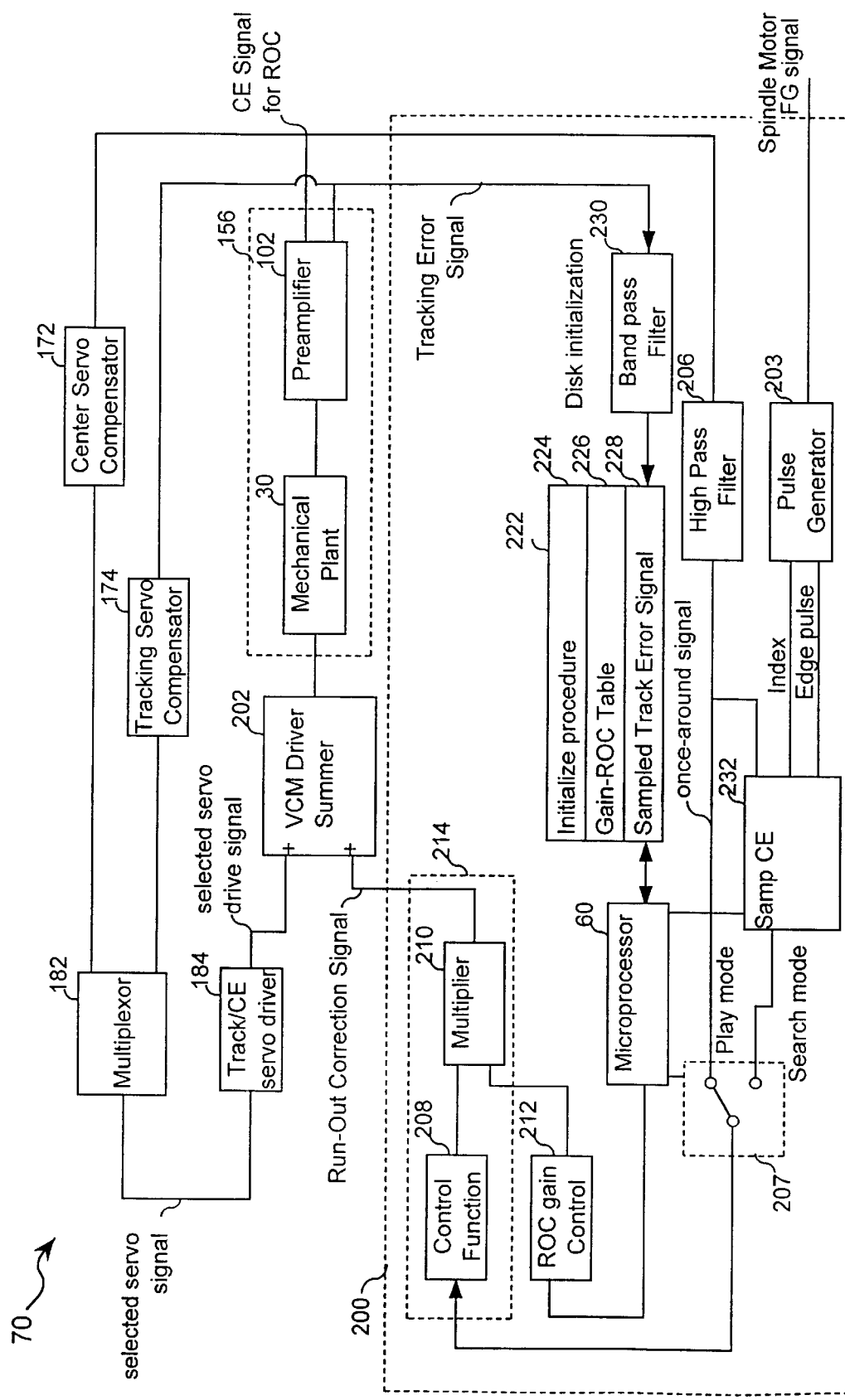
FIG. 7 illustrates a circuit for generating a refined center error signal that has been corrected for run-out in accordance with an embodiment of the present invention.

In FIG. 7, in a particularly noteworthy aspect of the invention, the circuit 70 uses the run-out component from the center error signal to control the tracking actuator to adjust for run-out.

The preamplifier 102 produces the center error signal (CE) and the tracking error signal (TE) which are passed through a center servo compensator 172 and a tracking servo compensator 174 to generate a compensated center error signal and compensated tracking error signal, respectively. The center servo compensator 172 and the tracking servo compensator 174 and are well-known and perform any necessary inversions of the center error signal and the tracking error signal, respectively, needed for the feedback loop.

In response to the microprocessor 60, a multiplexor 182 selects either the compensated tracking error signal or the compensated center error signal as a selected servo signal which is processed in a Track/CE servo driver 184 and output as a selected servo drive signal. The microprocessor 60 selects the compensated tracking error signal for play mode, and selects the compensated center error signal for rough search mode. In an alternate embodiment, the multiplexor 182 is implemented by the switch 160 of FIG. 6.

In the invention, a run-out control block 200 generates a run-out correction signal. A VCM driver summer 202 produces the tracking actuator drive signal (adjusted servo drive signal) by adding the run-out correction signal to the selected servo drive signal.

Play mode is a steady-state operation in which the head follows the spiral track. If the spiral track becomes oval due to eccentricity of the disk, the motion of the lens will follow the run-out. The run-out appears as a run out component in the center error signal, and the frequency of the run-out component is proportional to the rotational speed of the disk.

In play mode, when the tracking servo is enabled and the lens is following the spiral track, the center error signal represents the relative motion between the lens and the sled with respect to the disk. The center error signal can detect the position the lens by approximately ±400 microns with respect to a center position. Since the maximum amount of run-out for a DVD disk is approximately 150 microns, the center error signal can be used for run-out detection and correction.

When the lens is properly positioned with respect to the track centerline and if there is no run-out, the center error signal will have a value of zero. If the lens moves to follow the run-out while staying on the track centerline, the center error signal will have a positive and a negative value indicating run-out.

During play mode, in the run-out control block 200, the center error (CE) signal for run-out correction (ROC) is filtered through a high pass filter 206 to remove the DC component and provide a filtered center error signal or once-around signal. A switch 207 is set by the microprocessor 60 to pass the once-around signal during play mode.

Another noteworthy aspect of the invention is the control function block 208 that further processes the once-around signal to generate a modified once-around signal. The control function block 208 applies a second order transfer function to the once-around signal to cancel out poles generated by the dynamics of the mechanical plant. A mechanical plant transfer function represents the dynamics of the mechanical components of the disk drive, and the coefficients of the mechanical plant transfer function are known. The second order transfer function is the reciprocal of the mechanical plant transfer function and has double poles in the denominator. The control function block 208 will be discussed in further detail below.

Because the control function block 208 implements the reciprocal of the mechanical plant transfer function, the run-out control block 200 is not sensitive to the frequency of the run-out. Therefore, the run-out control block 200 corrects for run-out at any frequency, and relieves a main tracking servo loop from tracking run-out.

After the modified once-around signal is generated, a multiplier 210 multiplies the predetermined run-out gain factor and the modified once-around signal to produce the run-out correction signal. The run-out gain factor is determined at disk initialization and is stored in a run-out gain control register 212.

Preferably, a digital signal processor 214 implements the control function block 208 and the multiplier 210.

Figure 8:
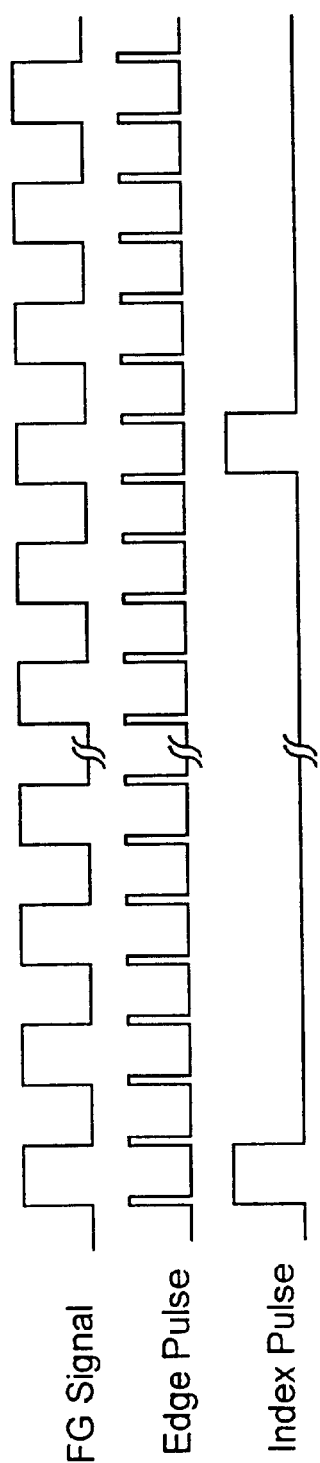
FIG. 8 illustrates the timing of FG pulses, edge pulses and an index pulse.

Many optical disk drives that use a brushless DC motor supply an FG signal which indicates the position of the spindle motor. Referring to both FIGS. 7 and 8, a pulse generator 203 receives the FG signal and outputs a series of edge pulse signals and an index signal. The edge pulses are generated at both the rising and falling edges of the FG signal. The FG signal is divided by the number of cycles per revolution to generate the index signal at each revolution of the motor.

During search mode, the lens is not following the track and the center error signal will not include the run-out component. In a noteworthy aspect of the invention, the center error signal is sampled and stored. During search mode, the stored center error signal is used to compensate for run-out. The stored center error signal is associated with the rotational position of the spindle motor based on the index signal and the edge pulses. During search mode, the current rotational position of the spindle motor is sensed and the stored center error signal is output based on the current rotational position of the spindle motor.

During the rough search mode, the tracking actuator driver is enabled to position the lens. When the sled is moving at high speed across the tracks, the bandwidth of the tracking actuator drive signal is kept low so that the run-out control block 200 will follow the run-out. Because the run-out control block 200 causes the lens to follow the run-out using the stored sampled center error signal, the lens and head assembly will not encounter the higher relative motion caused by the run-out. Therefore, the precision of the rough search is improved, thereby improving the speed of positioning the sled and lens. Because of the run-out compensation, the lens is more closely positioned to the target track after the rough search and the amount of time to recapture the track in a fine search is reduced. Therefore, access time is reduced.

The run-out gain factor and sampled center error signal are initialized when a new disk is inserted into the disk drive. The microprocessor 60 is coupled to a memory 222 that stores the Initialize procedure 224, a Gain-ROC Table 226 and the sampled tracking error signal 228. A band-pass filter 230 filters the tracking error signal about a center frequency equal to a predetermined rotational frequency of the disk. As will be described below, the Initialize procedure 224 causes the microprocessor 60 to vary the run-out gain factor and measure a run-out component for each gain factor which is stored in the Gain-ROC table 226. The run-out gain factor is varied a predetermined number of times. A run-out gain factor that produces the smallest run-out component in the tracking error signal is selected as the selected run-out gain factor and stored in the run-out gain control block 212.

A memory 232 receives and stores a sampled center error signal (Samp CE) synchronized to the index and edge pulses. The memory 232 is a semiconductor random access memory. The sampled center error signal is received from the high pass filter 206 simultaneous with the index and edge pulses. The index pulse is generated at each revolution of the spindle motor and is synchronized to one of the edge pulses. An edge count counts the number of edge pulses with respect to the index pulse and is used as an address at which to store and retrieve the sampled center error signals from the memory 232. The edge count has a value of zero starting at the sampled center error signal value associated with the index pulse and is incremented at every edge pulse. A sampled center error signal value is stored in the memory 232 the index pulse and each edge pulse.

Figure 9:
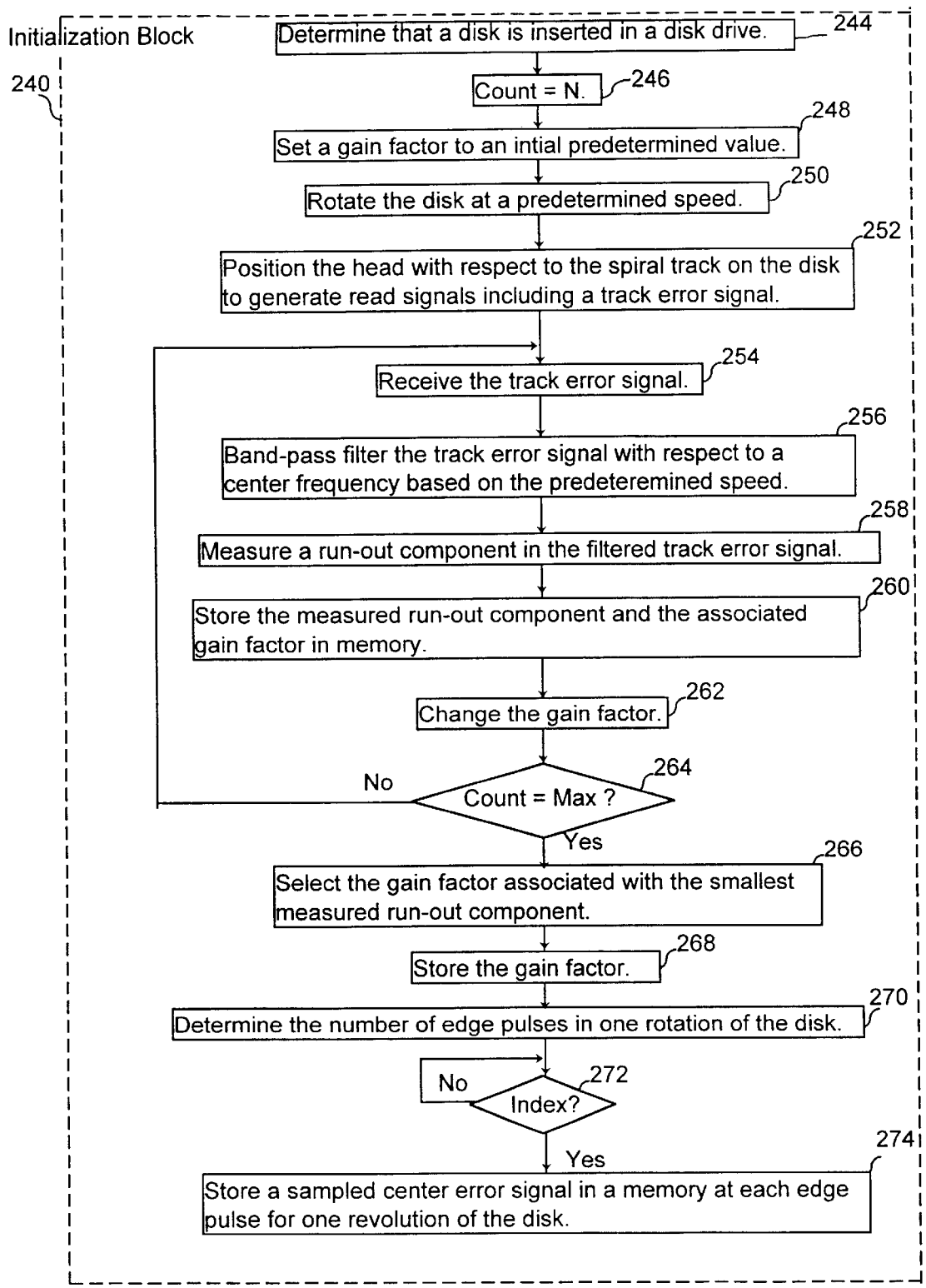
FIG. 9 is a flowchart of a method of generating a run-out gain factor and storing a sampled center error signal using the circuit of FIG. 7 in accordance with an embodiment of the present invention.

In FIG. 9, steps 244–274 perform the initialization of the run-out gain factor and the sampled center error signal implemented in the Initialize procedure 224 (FIG. 7). Step 244 determines that a disk is inserted into the disk drive. In step 246, the count is set equal to a predetermined value N. In step 248, a run-out gain factor is set equal to an initial predetermined value. In step 250, the disk is rotated at a predetermined speed. In step 252, the head is positioned with respect to the spiral track to generate read signals that include a tracking error signal.

In step 254, the tracking error signal is received. In step 256, the track errorsignal is band-pass filtered with respect to a center frequency based on the predetermined rotational speed of the disk to provide a filtered tracking error signal. In step 258, a run-out component in the filtered tracking error signal is measured. In step 260, the run-out component and the associated gain factor are stored in the Gain-ROC Table 226 (FIG. 7). Step 262 selects a new run-out gain factor. In step 264, if the Count is less than a Maximum predetermined value (MAX), the process repeats at step 254.

If the Count is equal to the Maximum predetermined value (MAX), in step 266, the microprocessor selects the gain factor associated with the smallest measured run-out component as the selected run-out gain factor and, in step 268, stores the selected gain factor in the run-out gain control register 212 (FIG. 7).

Steps 270–274 are used to store a sampled center error signal in memory 232 (FIG. 7) for use during search mode. In step 270, the initialization procedure determines the number of edge pulses in one rotation of the disk. In step 272, the initialization procedure waits for the index signal. In step 274, once the index signal occurs, a sampled center error signal is stored in memory at each edge pulse for one revolution of the disk. In this way, the sampled center error signal is synchronized to the rotational position of the spindle motor using the edge pulses, and the sampled center error signal is used for run-out correction during search mode.

Figure 10:
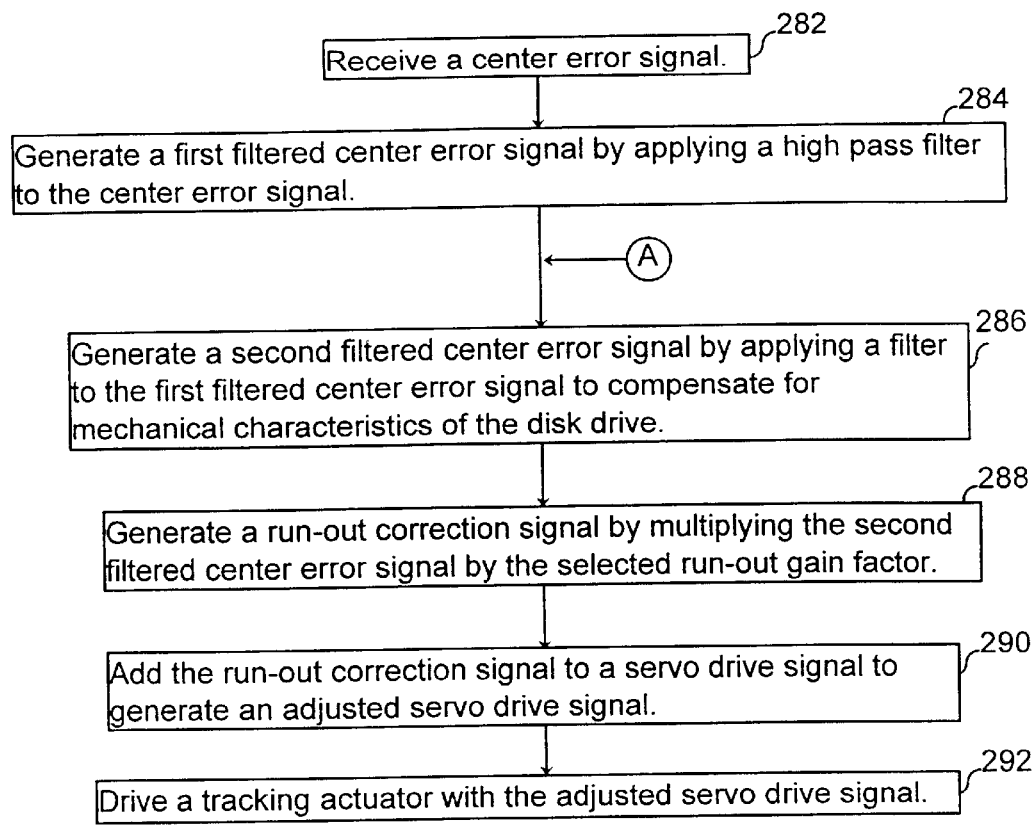
FIG. 10 is a flowchart of a method of correcting for run-out during play mode using the circuit of FIG. 7 in accordance with an embodiment of the present invention.

Referring to both FIGS. 7 and 10, a method for correcting for run-out during play mode will be explained. In step 282, a center error signal is received. In step 284, a first filtered center error signal is generated by applying a high pass filter (e.g., 206 of FIG. 7) to the center error signal. In step 286, a second filtered center error signal is generated by applying a low pass filter (e.g., 208 of FIG. 7) to the first filtered center error signal to compensate for the mechanical dynamics of the disk drive. In step 288, a run-out correction signal is generated by multiplying the second filtered center error signal by the selected run-out gain factor (e.g., 210 of FIG. 7). In step 290, the run-out correction signal is added to a selected servo drive signal to generate an adjusted servo drive signal. In step 292, a tracking actuator is driven with the adjusted servo drive signal.

Referring to both FIGS. 7 and 11, in another noteworthy aspect of the invention, a method for correcting for run-out during search mode will be described. The circuit of FIG. 7 is used to apply the run-out correction to the stored sampled center error values during search mode. In step 302, the search procedure waits for the index signal. After the index pulse occurs, in step 304, the edge pulse counter (Edge_count) is set equal to zero. In step 306, the sampled center error signal value associated with Edge_count is read from the memory 232 (FIG. 7) and supplied to the control function block 208 (FIG. 7). When the edge pulse counter equals zero, the first sample value stored in the memory will be supplied to the control function block 208. The supplied center error signal is subsequently processed by the circuit of FIG. 7 using the method as indicated by the arrow to A of FIG. 10. In step 308, the edge counter (Edge_count) is incremented by one. Step 310 waits for the next edge pulse. Step 312 determines if the edge pulse was an index pulse, and if not returns to step 306 to output the next stored sampled center error signal value. If an index pulse occurs, step 310 proceeds to step 304.

Synchronizing the output of the stored sampled center error signal values to edge pulse signals helps to accommodate for changes in the rotational speed of the spindle motor and helps to ensure that appropriate run-out correction is applied.

Figure 11:
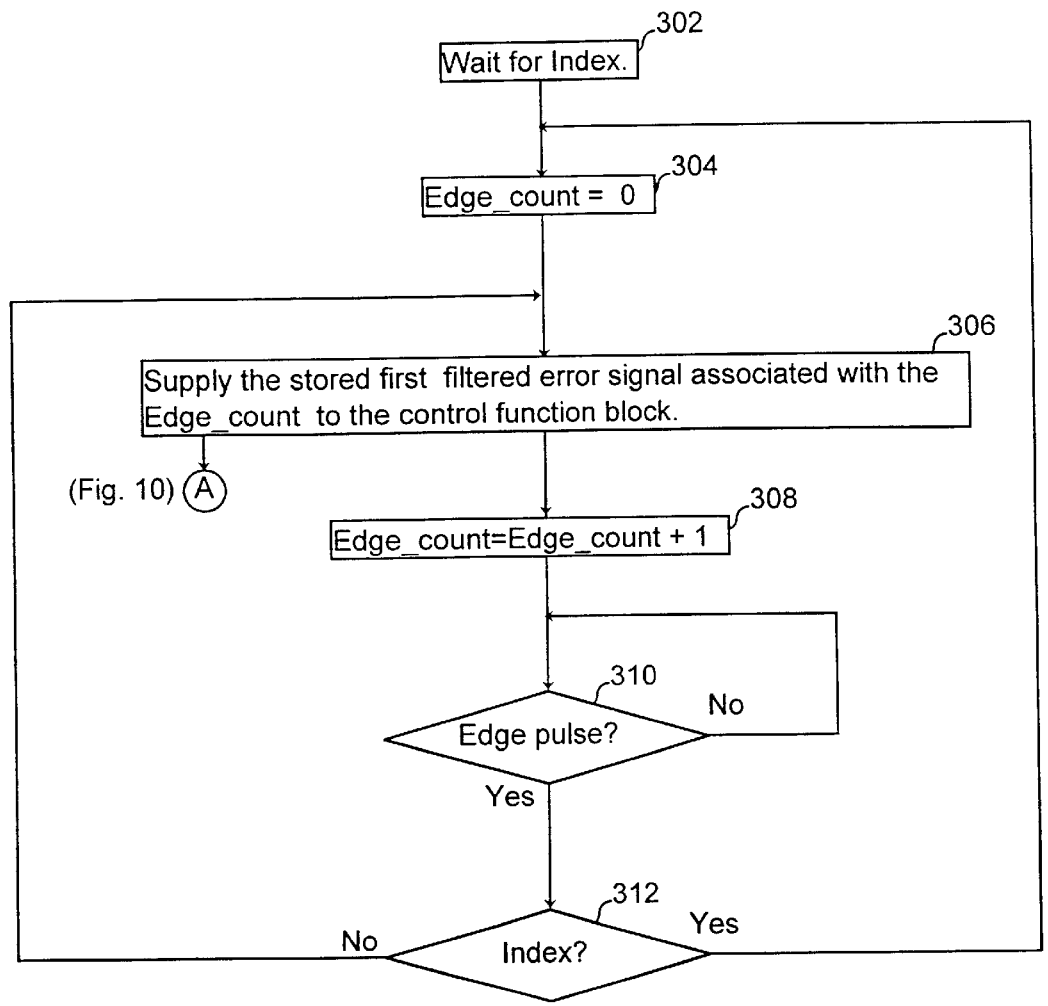
FIG. 11 is a flowchart of a method of correcting for run-out during search mode using the circuit of FIG. 7 in accordance with an embodiment of the present invention.
Figure 12:
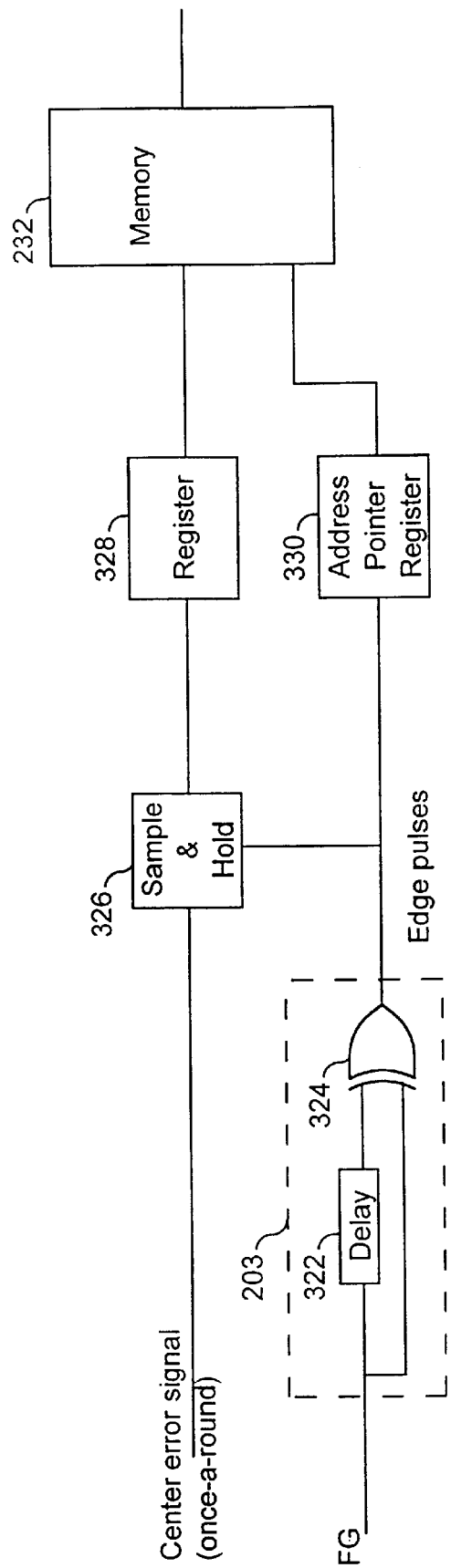
FIG. 12 is a more detailed block diagram of the pulse generator and memory for storing and retrieving a sampled center error signal of FIG. 7.

In FIG. 12, a more detailed block diagram of the pulse generator 203 and memory 232 of FIG. 7 implements the flowchart of FIG. 11. In the pulse generator 203, a delay line 322 delays the FG pulses from the disk drive to generate delayed FG pulses. An exclusive-or gate 324 generates the edge pulses by performing an exclusive-or between the FG pulses and the delayed FG pulses.

A sample and hold circuit 326 receives the center error (once-a-round) signal. At each edge pulse, the sample and hold circuit 326 samples the value of the center error signal, and converts the center error signal to a digital form—a sampled center error signal value. A register 328 receives the sampled center error signal value. An address pointer register 330 supplies the memory address at which to store the sampled center error signal value. The address pointer register 330 is incremented at each edge pulse. In other words, the address pointer register 330 stores the edge count, described above. The memory 232 stores each sampled center error signal value at the address pointed to by the address pointer register 330.

In a prior art method, the tracking error signal was stored and used to correct for run-out in synchronism with the edge pulses. However, this prior art method corrects for run-out only for a narrow range of speeds near the rotational speed at which the tracking error samples were stored and could not correct for run-out at all rotational frequencies of the disk. In constant linear velocity mode, the rotational frequency of the disk may increase by a factor of three with respect to a base rotational frequency. The inventor realized that the inability of this prior art method to correct for run-out at all rotational speeds was due to the characteristics of the mechanical plant of the disk drive, and, in particular, the mechanical characteristics of the tracking actuator.

Figure 13:
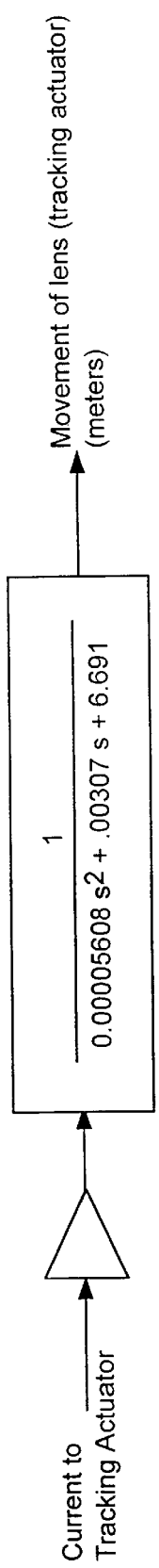
FIG. 13 is an exemplary Laplace transform of a transfer function of the mechanical plant of a disk drive.

In FIG. 13, the relationship of input current to the tracking actuator with respect to the distance moved by the lens for one disk drive is shown using a Laplace transform. This relationship describes the mechanical dynamics of the mechanical plant, in particular, the tracking actuator.

Figure 14:
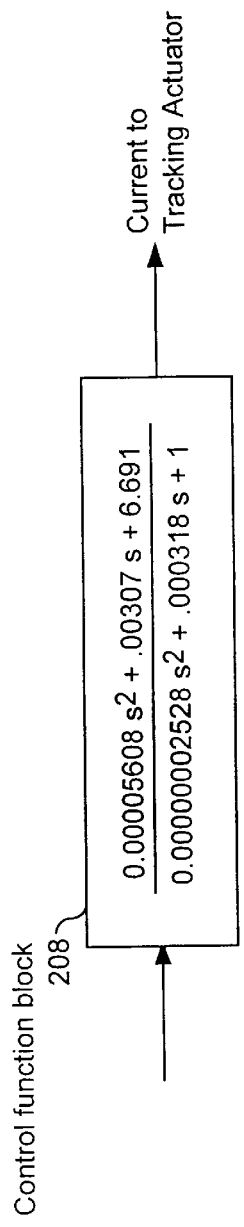
FIG. 14 is an exemplary Laplace transform implemented in an embodiment of a control function block of FIG. 7.

In FIG. 14, in the control function block 208, the reciprocal of the Laplace transform of FIG. 13 is applied to the center error signal to compensate for the mechanical characteristics of the mechanical plant. To help to ensure the stability of the system, a 1 KHz double pole filter is included in the denominator. Since the maximum rotational frequency is 10,000 revolutions per minute, 166 Hz, the 1 KHz poles will not significantly affect the operation of the control function block 208 at the rotational frequencies of the disk drive.

Figure 15:
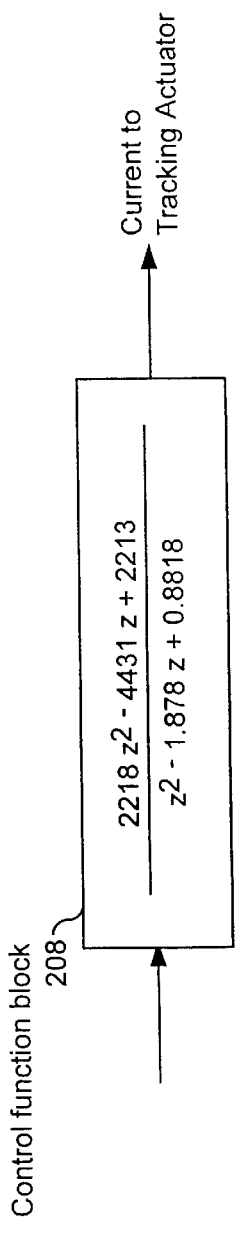
FIG. 15 is an exemplary Z-transform implemented in an embodiment of the control function block of FIG. 7.

In FIG. 15, the Laplace transform of FIG. 14 is converted to a discrete time domain representation, a Z-transform, for implementation in the control function block 208. In the relationship shown in FIG. 15, the sampling frequency was 50 KHz.

Figure 16:
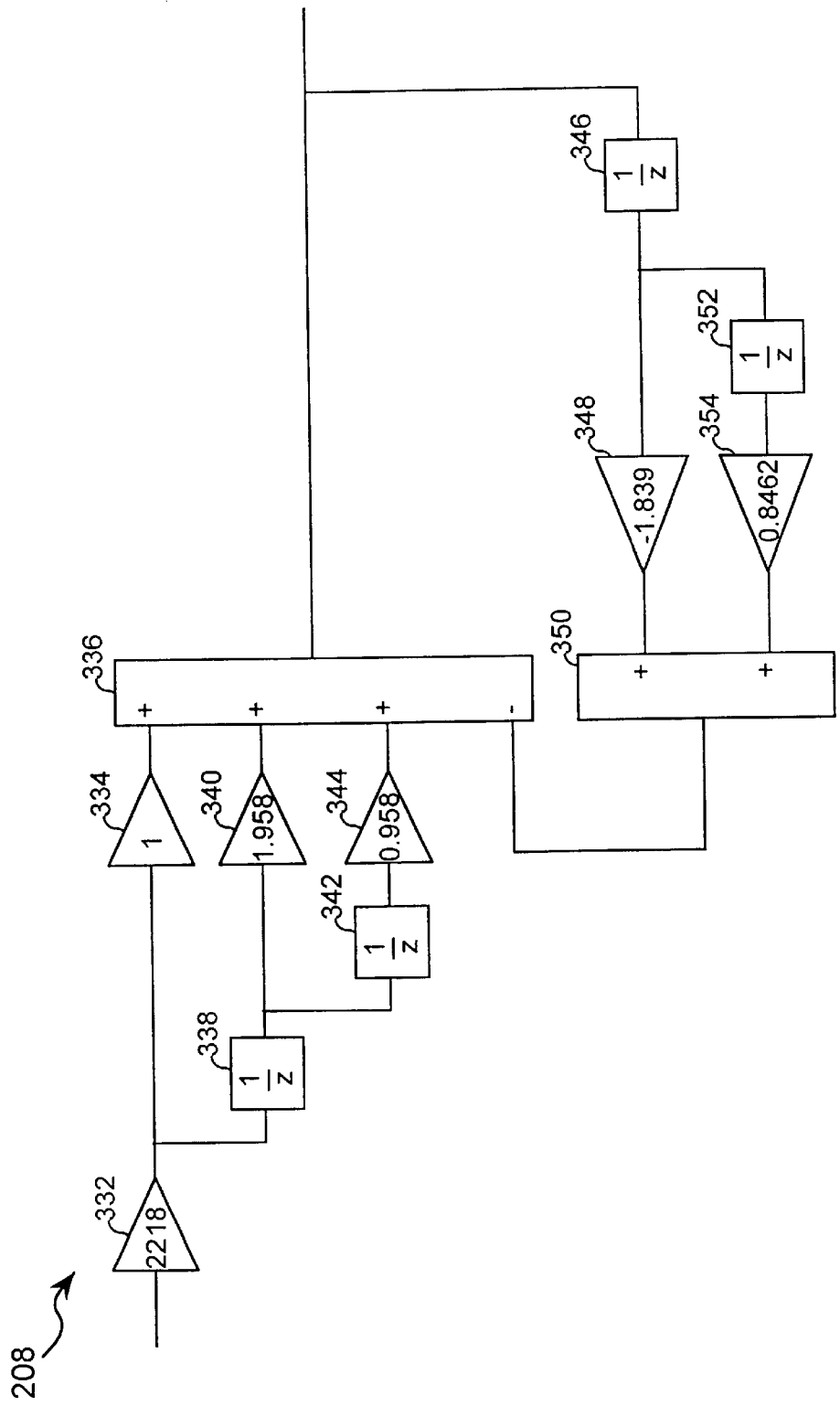
FIG. 16 is an exemplary control function block implementing the Z-transform of FIG. 15.

In FIG. 16, an exemplary control function block 208 implements the Z-transform of FIG. 15. A first amplifier 332 with a gain of 2,218 receives the center error signal and outputs a first amplified signal. The first amplified signal, via second amplifier 334, is input to a first summing junction 336. A first delay block 338 receives and stores the first amplified signal for one sample time and outputs a first delayed signal. A third amplifier 340 multiplies the first delayed signal by a gain of 1.958 which is supplied to the first summing junction 336. A second delay block 342 receives and stores the first delayed signal for one sample time and outputs a second delayed signal. A fourth amplifier 344 multiplies the second delayed signal by a gain of 0.958 which is also supplied to the first summing junction 336.

The output of the first summing junction 336 is the run-out correction signal. In a feedback path, the run-out correction signal is delayed by a third delay block 346 for one clock cycle to output a delayed run-out correction signal. A fifth amplifier 348 multiplies the delayed run-out correction signal by a gain of −1.839 which is supplied to a second summing junction 350. The delayed run-out correction signal is delayed by a fourth delay block 352, multiplied by a gain of 0.8462 by sixth amplifier 354 and supplied to the second summing junction 350. The output from the second summing junction 350 is supplied to a negative input of the first summing junction 336.

In this way, the invention adjusts the tracking actuator drive signal with a center error signal to correct for run-out at all speeds in both constant linear velocity and constant angular velocity disk drives. The center error signal is filtered to compensate for the mechanical dynamics of the disk drive prior to applying a run-out reducing gain factor. The invention corrects for run-out during both play and rough search modes. In particular, because the center error signal is sampled and stored in synchronization with rotational position information, the invention corrects for run-out in search mode. Therefore, the access time of a rough search operation is also reduced.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A disk drive comprising:
   a spindle motor to rotate a disk;
   a head to read information from said disk and generate read signals;
   a tracking actuator, responsive to a servo drive signal, to position said head with respect to said disk;
   a sled coupled to said tracking actuator and said head, also to position said head with respect to said disk;
   a preamplifier to generate a center error signal from said read signals;
   a high pass filter to generate a filtered center error signal by removing at least a DC component in said center error signal;
   a memory that stores a sampled center error signal;
   a switching mechanism to select between said sampled center error signal and said filtered center error signal to be sent to a multiplier;
   wherein said multiplier multiplies said selected center error signal by a run-out reducing gain factor to produce a run-out correction signal; and
   a summer that adds said run-out correction signal to a selected servo drive signal to produce an adjusted servo drive signal that is supplied to said tracking actuator.

2. The disk drive of claim 1, further comprising:
   a filter for receiving and filtering said selected center error signal.

3. The disk drive of claim 1, wherein said filter filters said selected center error signal by applying an inverse of a transfer function representing mechanical dynamics of said disk drive to said selected center error signal.

4. The disk drive of claim 1, further comprising:
   a band pass filter to generate a run-out signal from a tracking error signal;
   a processor; and
   a memory storing instructions that cause the processor to:
   set a gain factor to an initial predetermined value;
   receive a tracking error signal;
   measure a run-out component in said run-out signal, said run-out component being associated with said gain factor;

change said gain factor;

repeat said instructions that generate, measure and change a plurality of times; and associate said run-out reducing gain factor with a smallest measured run-out component.

5. An apparatus for correcting for run-out in an optical disk drive comprising:

a preamplifier to generate a center error signal;

a high pass filter to generate a filtered center error signal by removing at least a DC component in said center error signal;

a memory that stores a sampled center error signal;

a switching mechanism to select between said sampled center error signal and said filtered center error signal to be sent to a multiplier;

wherein said multiplier multiplies said selected center error signal by a run-out reducing gain factor to produce a run-out correction signal; and a summer that adds said run-out correction signal to a selected servo drive signal to produce an adjusted servo drive signal that is supplied to a tracking actuator.

6. The apparatus of claim 5, further comprising:

a filter for receiving and filtering said selected center error signal.

7. The apparatus of claim 6, wherein said filter filters said selected center error signal by applying an inverse of a transfer function representing mechanical dynamics of said disk drive to said selected center error signal.

8. The apparatus of claim 5 further comprising:

a band pass filter to generate a run-out signal from a tracking error signal;

a processor; and a memory storing instructions that cause the processor to:

set a gain factor to an initial predetermined value;

receive a tracking error signal;

measure a run-out component in said run-out signal, said run-out component being associated with said gain factor;

change said gain factor;

repeat said instructions that generate, measure and change a plurality of times; and associate said run-out reducing gain factor with a smallest measured run-out component.

* * * * *